United States Patent
Trainer et al.

(10) Patent No.: US 9,344,010 B2
(45) Date of Patent: May 17, 2016

(54) POWER ELECTRONIC CONVERTER

(71) Applicants: ALSTOM Technology Ltd, Baden (CH); David Reginald Trainer, Derby (GB); Nnamdi Okaeme, London (GB)

(72) Inventors: David Reginald Trainer, Derby (GB); Nnamdi Okaeme, London (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 14/385,967
(22) PCT Filed: Mar. 20, 2013
(86) PCT No.: PCT/GB2013/050725
§ 371 (c)(1),
(2) Date: Sep. 17, 2014
(87) PCT Pub. No.: WO2013/140168
PCT Pub. Date: Sep. 26, 2013

(65) Prior Publication Data
US 2015/0049530 A1 Feb. 19, 2015

(30) Foreign Application Priority Data
Mar. 22, 2012 (WO) .................. PCT/EP2012/055137

(51) Int. Cl.
*H02M 7/219* (2006.01)
*H02M 7/797* (2006.01)
*H02M 7/483* (2007.01)

(52) U.S. Cl.
CPC .............. *H02M 7/797* (2013.01); *H02M 7/219* (2013.01); *H02M 2007/4835* (2013.01); *Y02E 60/60* (2013.01)

(58) Field of Classification Search
CPC ............. H02J 3/36; H02M 7/42; H02M 7/44; H02M 7/48; H02M 7/483; H02M 7/49; H02M 7/5387; H02M 7/797; H02M 7/7575; H02M 2007/4835
USPC .................. 363/15–17, 34–35, 37–43, 50–55, 363/56.01–56.05, 57–58, 84–89, 95–98, 363/123, 127, 131–132, 135–138
See application file for complete search history.

(56) References Cited
U.S. PATENT DOCUMENTS

| 4,998,054 A | 3/1991 | Bose et al. |
| 2012/0063185 A1 | 3/2012 | Janning |

(Continued)

FOREIGN PATENT DOCUMENTS

| WO | WO 2011124258 A1 * | 10/2011 | ............ H02M 7/797 |
| WO | WO 2011160678 A1 | 12/2011 | |

(Continued)

OTHER PUBLICATIONS

International Search Report and Written Opinion for PCT Application No. PCT/GB2013/050725, mailed Jul. 1, 2013.

(Continued)

*Primary Examiner* — Timothy J Dole
*Assistant Examiner* — Ivan Laboy Andino
(74) *Attorney, Agent, or Firm* — Foley & Lardner LLP

(57) ABSTRACT

A power electronic converter (30), for connecting AC and DC networks (46,44) and transferring power therebetween, comprises: first and second DC terminals (32,34) defining a DC link for connection to a DC network (44); wherein, in use, the DC link has a reversible DC link voltage applied thereacross; at least one converter limb (36) extending between the first and second DC terminals (32,34) and having first and second limb portions (38,40) separated by an AC terminal (42) for connection to an AC network (46), each limb portion (38,40) including at least one rationalized module (52) having first and second sets of series-connected current flow control elements (54) connected in parallel with at least one energy storage device (56), each set of current flow control elements (54) including a primary active switching element to selectively direct current through the energy storage device (56) and a primary passive current check element to limit current flow through the rationalized module (52) to a single direction, the current flow control elements (54) and the or each energy storage device (56) combining to selectively provide a voltage source to synthesize an AC voltage at the AC terminal (42); and a first controller (60) to selectively switch the or each rationalized module (52) in each limb portion (38,40) to control the configuration of the AC voltage at the corresponding AC terminal (42) so as to transfer power from the AC network (46) to the DC network (44) in an AC to DC power transfer mode and to transfer power from the DC network (44) to the AC network (46) in a DC to AC power transfer mode, wherein each limb portion (38,40) includes: one or more secondary passive current check elements (48) to limit current flow through the corresponding limb portion (38,40) to a single direction between the corresponding AC and DC terminals (42,32,34), the or each secondary passive current check element (48) being connected in series with the or each rationalized module (52); or one or more secondary active switching elements that is connected in series with the or each rationalized module (52).

8 Claims, 6 Drawing Sheets

(56) References Cited

U.S. PATENT DOCUMENTS

2013/0094264 A1* 4/2013 Crookes ............... H02J 3/1835
 363/127
2013/0208521 A1* 8/2013 Trainer et al. ................. 363/126

FOREIGN PATENT DOCUMENTS

| WO | WO-2012/055435 | 5/2012 |
| WO | WO-2013/000510 | 1/2013 |
| WO | WO-2013/017177 | 2/2013 |
| WO | WO-2013/068031 | 5/2013 |

OTHER PUBLICATIONS

Marquardt R.; Modular Multilevel Converter: An universal concept for HVDC-Networks and extended DC-Bus-applications, 2010 International Power Electronics Conference; Sapporo, Japan, Jun. 21, 2010 pp. 502-507, IEEE, Piscataway, NJ, USA.

* cited by examiner

POWER ELECTRONIC CONVERTER

This invention relates to a power electronic converter.

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC to DC power is also utilized in power transmission networks where it is necessary to interconnect AC networks operating at different frequencies. In any such power transmission network, converters are required at each interface between AC and DC power to effect the required conversion, and one such form of converter is a voltage source converter (VSC).

A known voltage source converter is shown in FIG. 1 and includes a multilevel converter arrangement. The multilevel converter arrangement includes respective converter bridges 10 of series-connected converter cells 12. Each converter cell 12 includes a pair of series-connected insulated gate bipolar transistors (IGBTs) 14 connected in parallel with a capacitor 16. The individual converter cells 12 are not switched simultaneously and the converter voltage steps are comparatively small, and so such an arrangement eliminates the problems associated with the direct switching of the series-connected IGBTs 14.

The capacitor 16 of each converter cell 12 is configured to have a sufficiently high capacitive value in order to constrain the voltage variation at the capacitor terminals in such a multilevel converter arrangement. A DC side reactor 18 is also required in each converter bridge 10 to limit transient current flow between converter limbs 20, and thereby enable the parallel connection and operation of the converter limbs 20.

According to an aspect of the invention, there is provided a power electronic converter, for connecting AC and DC networks and transferring power therebetween, comprising:

first and second DC terminals defining a DC link for connection to a DC network; wherein, in use, the DC link has a reversible DC link voltage applied thereacross;

at least one converter limb extending between the first and second DC terminals and having first and second limb portions separated by an AC terminal for connection to an AC network, each limb portion including at least one rationalised module having first and second sets of series-connected current flow control elements connected in parallel with at least one energy storage device, each set of current flow control elements being connected in parallel with at least one energy storage device, each set of current flow control elements including a primary active switching element to selectively direct current through the energy storage device and a primary passive current check element to limit current flow through the rationalised module to a single direction, the current flow control elements and the or each energy storage device combining to selectively provide a voltage source to synthesise an AC voltage at the AC terminal; and a first controller to selectively switch the or each rationalised module in each limb portion to control the configuration of the AC voltage at the corresponding AC terminal so as to transfer power from the AC network to the DC network in an AC to DC power transfer mode and to transfer power from the DC network to the AC network in a DC to AC power transfer mode, wherein each limb portion includes:

one or more secondary passive current check elements to limit current flow through the corresponding limb portion to a single direction between the corresponding AC and DC terminals, the or each secondary passive current check element being connected in series with the or each rationalised module; or one or more secondary active switching elements that is connected in series with the or each rationalised module.

During operation of the power electronic converter to transfer power between the AC and DC networks, the flow of current in the power electronic converter alternates between the limb portions over a duty cycle. As such, when one of the limb portions is configured to conduct current between the AC terminal and corresponding DC terminal (i.e. is in a conducting state), the other of the limb portions is configured to be switched out of circuit (i.e. is in a non-conducting state).

The limb portion in the non-conducting state experiences a differential voltage thereacross, the differential voltage being the difference between the voltages at the AC terminal and corresponding DC terminal. The differential voltage experienced by the limb portion in the non-conducting state may be shared between the or each secondary passive current check element or secondary active switching element and the or each rationalised module. In other words, the or each secondary passive current check element or secondary active switching element may support part of a differential voltage appearing across the corresponding limb portion when that limb portion is in a non-conducting state. This means that the rationalised module or the plurality of rationalised modules in each limb portion may be not required to be capable of blocking the entire differential voltage, since the or each secondary passive current check element or secondary active switching element can be used to block part of the differential voltage, thus permitting a reduction in voltage rating of the rationalised module or the plurality of rationalised modules in each limb portion.

In contrast, during operation of the known voltage source converter shown in FIG. 1, the series-connected converter cells 12 are required to be capable of blocking the entire differential voltage experienced by the corresponding converter bridge 10, thus requiring the series-connected converter cells to have a relatively higher combined voltage rating for a given set of AC and DC voltages of the AC and DC networks.

The series connection of the or each secondary passive current check element or secondary active switching element and the or each rationalised module in each limb portion can therefore reduce considerably the required number of rationalised modules in each limb portion required to carry out transfer of power between the AC and DC networks.

The arrangement of the power electronic converter according to the invention results in a small, lightweight, inexpensive, efficient and reliable means of connecting AC and DC networks and transferring power therebetween.

It will be understood that the AC to DC power transfer mode relates to voltage rectification and the DC to AC power transfer mode relates to voltage inversion.

The power electronic converter is operated in either of the AC to DC and DC to AC power transfer modes without having to modify the structure of the or each rationalised module in each limb portion to permit current flow in the opposite direction. In particular, the power electronic converter is operated to transfer power from the AC network to the DC network by applying a first polarity of the DC link voltage across the DC link and to transfer power from the DC network to the AC network by applying a second polarity of the DC link voltage across the DC link, whereby the first polarity is opposite to the second polarity. In other words, the power electronic converter is operated in either of the AC to DC and DC to AC power transfer modes by reversing the DC link voltage across the DC link.

The series-connection of the or each secondary passive current check element or secondary active switching element and the or each rationalised module in each limb portion means that the secondary passive current check elements or secondary active switching elements dictate which limb portion is in conduction and thereby is in use to synthesise the AC voltage at the or each AC terminal.

The inclusion of the or each secondary passive current check element in each limb portion restricts the limb portion current to a single direction and is thus compatible with the unidirectional nature of the or each rationalised module. This means that each limb portion does not require a secondary active switching element connected in series with the or each rationalised module to dictate which limb portion is in conduction. This results in a more cost-efficient and reliable power electronic converter, since passive current check elements (e.g. diodes) are lighter, smaller, and simpler than active switching elements.

However, the unidirectional nature of the or each secondary passive current check element means that the or each secondary passive current check element in each limb portion can only block a reverse voltage and thus cannot block a forward voltage. This in turn means that, whilst the or each secondary passive current check element in a limb portion in a non-conducting state is capable of blocking part of the differential voltage in one of the AC to DC and DC to AC power transfer modes, reversal of the polarity of the DC link voltage across the DC link will render the or each secondary passive current check element incapable of blocking part of the differential voltage in the other of the AC to DC and DC to AC power transfer modes.

Consequently, in order to enable the power electronic converter to operate in both the AC to DC and DC to AC power transfer modes, the voltage rating of the rationalised module or the plurality of rationalised modules in each limb portion must be increased to be capable of supporting the entire differential voltage experienced by the limb portion in the non-conducting state when the or each secondary passive current check element is rendered incapable of blocking part of the differential voltage.

Alternatively, for both the AC to DC and DC to AC power transfer modes, the direction of the or each secondary passive current check element in each limb portion may be rearranged to match the power transfer mode in order to enable the or each secondary passive current check element to block part of the differential voltage when the corresponding limb portion is in the non-conducting state. This however adds cost and structural complexity to the power electronic converter.

On the other hand the or each secondary active switching element in each limb portion may be configured to be capable of blocking both forward and reverse voltages. This means that the rationalised module or the plurality of rationalised modules in each limb portion would be required to block only part of the differential voltage for both the AC to DC and DC to AC power transfer modes, thus obviating the need to increase the voltage rating of the rationalised module or the plurality of rationalised modules in each limb portion to be capable of supporting the entire differential voltage experienced by that limb portion in the non-conducting state in both the AC to DC and DC to AC power transfer modes.

Preferably the first and second sets of current flow control elements are connected in parallel with the respective energy storage device in a full-bridge arrangement to form a 2-quadrant bipolar rationalised module that can provide negative, zero or positive voltage while conducting current in a single direction.

The or each rationalised module in each limb portion may be configured to set the power transferable in one of the AC to DC and DC to AC power transfer modes to be equal to the power transferable in the other of the AC to DC and DC to AC power transfer modes. In other words, the or each rationalised module in each limb portion may be configured to enable the first controller to switch the or each rationalised module in each limb portion to create a symmetrical transfer of power between the AC and DC networks, in which the power electronic converter provides full power transfer functionality in both directions.

The or each rationalised module in each limb portion may be configured to limit the power transferable in one of the AC to DC and DC to AC power transfer modes to be less than the power transferable in the other of the AC to DC and DC to AC power transfer modes. In other words, the or each rationalised module in each limb portion may be configured to enable the first controller to switch the or each rationalised module in each limb portion to create an asymmetrical transfer of power between the AC and DC networks, in which the power electronic converter provides full power transfer functionality in one direction and is able to provide power transfer in the other direction at a reduced level.

Preferably the or each rationalised module in each limb portion is configured to limit the power transferable in one of the AC to DC and DC to AC power transfer modes to be in the range of 10% to 15% of the power transferable in the other of the AC to DC and DC to AC power transfer modes.

A power electronic converter with an asymmetrical power transfer functionality is perfectly acceptable in certain power transfer applications with asymmetrical power transfer requirements. For example, the power electronic converter with an asymmetrical power transfer functionality may be used in power transfer applications where there is a heavy bias towards the export of power to a DC network and a minimal need to import power, such as arises in renewable wind and tidal power generation where the required power transfer is predominantly from the source to a distribution grid. The minimal need to import power may relate to infrequent transmission of power at a reduced level in the opposite direction for the purpose of starting up or operating hardware of wind and tidal farms before the hardware transitions to a power generation operating mode once availability of the prime mover (such as wind and tidal waves) is sufficient to generate the required amount of power.

The configuration of the or each rationalised module in each limb portion to create a power electronic converter with an asymmetrical power transfer functionality results in a more optimal power electronic converter for power transfer applications with asymmetrical power transfer requirements, in terms of losses, efficiency, size, weight and cost.

The controller may control the switching of the current flow control elements in the or each rationalised module in each limb portion to construct, at the or each AC terminal, an AC voltage with a peak value which is 27% higher than a DC voltage at the corresponding DC terminal. The construction of such an AC voltage at the or each AC terminal means that the product of the voltage provided by the rationalised module or the plurality of rationalised modules in each limb portion and the current flowing through the rationalised module or the plurality of rationalised modules in each limb portion gives a net zero energy exchange in the rationalised module or the plurality of rationalised modules in each limb portion over half of a duty cycle. In addition, the structure of the rationalised module permits the unidirectional current flowing through the rationalised module to flow in either forward or reverse directions through the or each energy storage device. This in turn allows selective real-time charging and discharging, and thereby control of the voltage level, of the or each energy storage device in each rationalised module whilst the power electronic converter is operated to transfer power between the AC and DC networks.

Preferred embodiments of the invention will now be described, by way of non-limiting examples only, with reference to the accompanying drawings in which.

Figure 1:
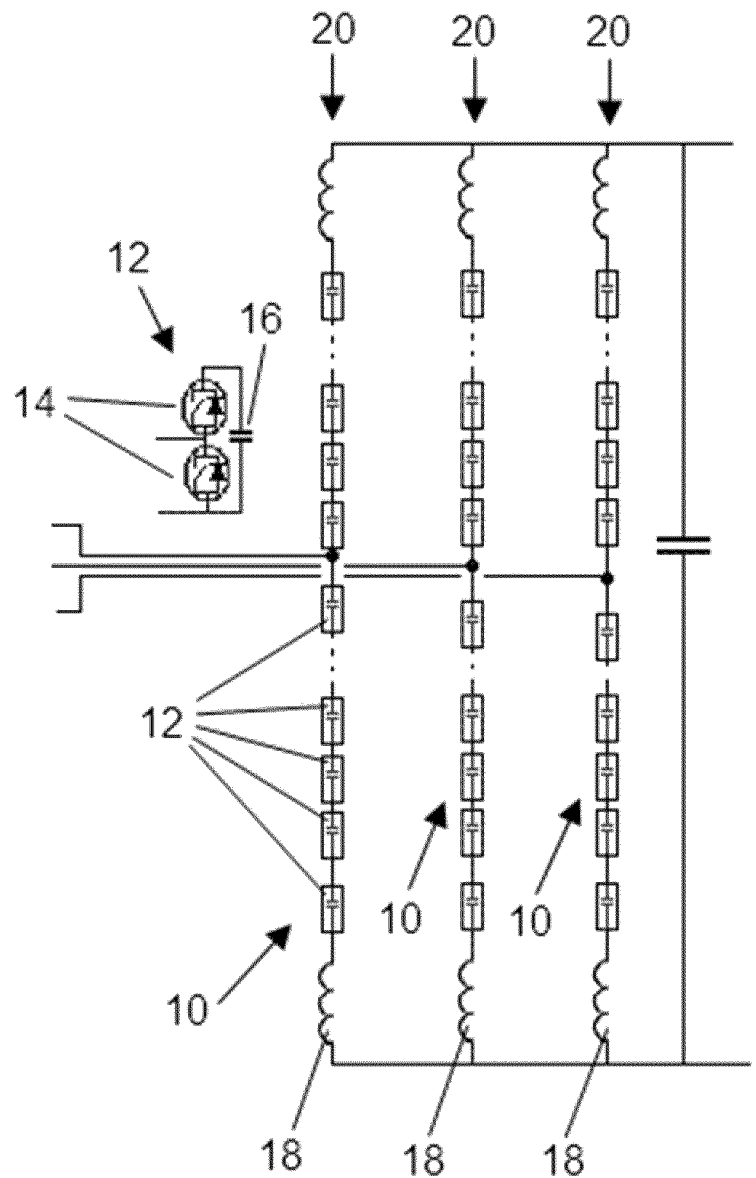
FIG. 1 shows, in schematic form, a prior art power electronic converter.
Figure 2:
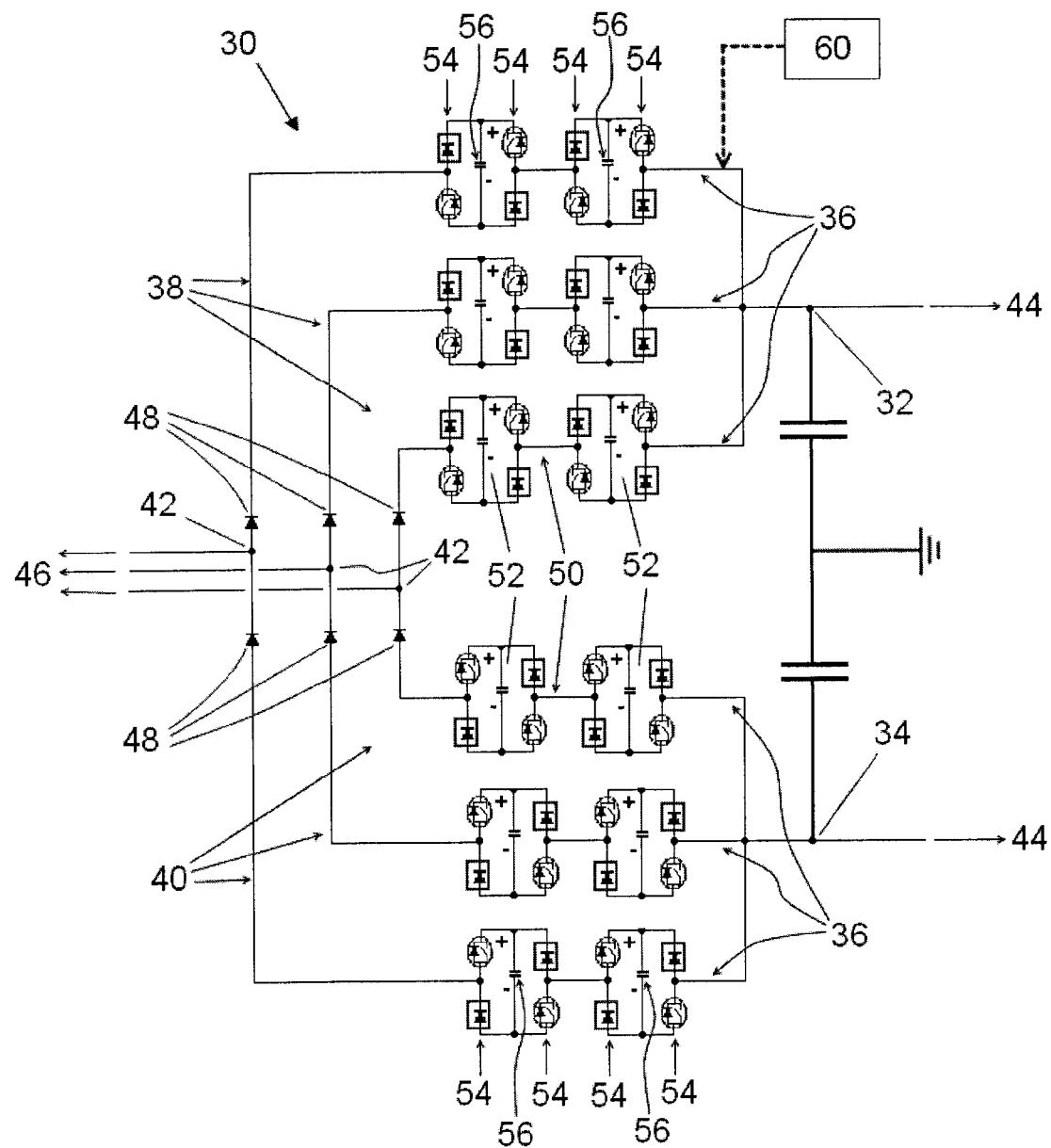
FIG. 2 shows, in schematic form, a power electronic converter according to a first embodiment of the invention.

A first power electronic converter 30 according to a first embodiment of the invention is shown in FIG. 2.

The first power electronic converter 30 includes first and second DC terminals 32,34 and a plurality of converter limbs 36. The first and second DC terminals 32,34 define a DC link. Each converter limb 36 extends between the first and second DC terminals 32,34 and has first and second limb portions 38,40 separated by an AC terminal 42.

In use, the first and second DC terminals 32,34 of the first power electronic converter 30 are respectively connected to first and second terminals of a DC network 44, a reversible DC link voltage being applied across the first and second terminals, and the AC terminal 42 of each converter limb 36 is connected to a respective phase of a multi-phase AC network 46. In this manner, in use, the DC link has a reversible DC link voltage applied thereacross.

Each of the first and second limb portions 38,40 includes a secondary passive current check element 48 connected in series with a chain-link converter 50.

Each secondary passive current check element 48 is in the form of a diode. The secondary passive current check element 48 in the first limb portion 38 is arranged so that current flowing in the first limb portion 38 can only flow from the AC terminal 42 to the first DC terminal 32. The secondary passive current check element 48 in the second limb portion 40 is arranged so that current flowing in the second limb portion 40 can only flow from the second DC terminal 34 to the AC terminal 42.

It is envisaged that, in other embodiments of the invention, the secondary passive current check element 48 may be replaced by a plurality of series-connected secondary passive current check elements.

Each chain-link converter 50 includes a plurality of series-connected rationalised modules 52.

Figure 3:
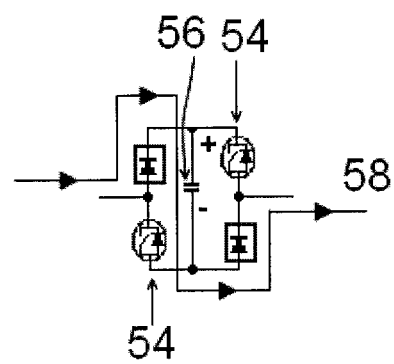
FIG. 3 shows, in schematic form, the structure of a rationalised module forming part of the power electronic converter of FIG. 2.
Figure 3:
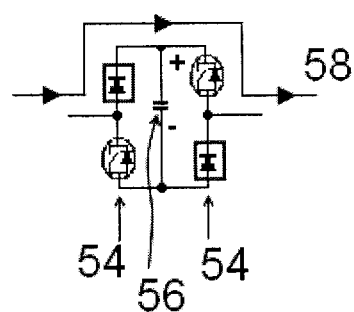
Figure 3:
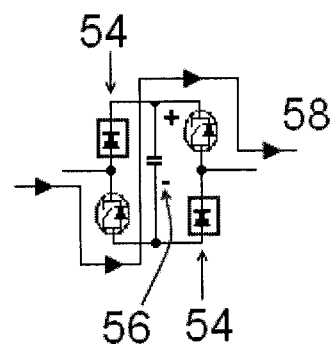

FIG. 3 shows, in schematic form, the structure of each rationalised module 52.

Each rationalised module 52 has first and second sets of series-connected current flow control elements 54 and an energy storage device in the form of a capacitor 56. The first and second sets of series-connected current flow control elements 54 are connected in parallel with the capacitor 56 in a full-bridge arrangement. Each set of current flow control elements 54 includes a primary active switching element connected in series with a primary passive current check element.

Each primary active switching element is constituted by a semiconductor device in the form of an Insulated Gate Bipolar Transistor (IGBT) which is connected in parallel with an anti-parallel diode. It is envisaged that each primary active switching element may be replaced by a different active switching element. For example, in other embodiments of the invention, each IGBT may be replaced by a gate turn-off thyristor, a field effect transistor, an injection-enhanced gate transistor, an integrated gate commutated thyristor or any other self-commutated semiconductor device.

Each primary passive current check element is in the form of a diode.

The capacitor 56 of each rationalised module 52 is selectively bypassed or inserted into the corresponding chain-link converter 50 by changing the states of the current flow control elements 54. This selectively directs current 58 through the capacitor 56 or causes current 58 to bypass the capacitor 56, so that the rationalised module 52 provides a negative, zero or positive voltage.

The capacitor 56 of the rationalised module 52 is bypassed when the current flow control elements 54 in the rationalised module 52 are configured to form a short circuit in the rationalised module 52. This causes current 58 in the corresponding chain-link converter 50 to pass through the short circuit and bypass the capacitor 56, and so the rationalised module 52 provides a zero voltage, i.e. the rationalised module 52 is configured in a bypassed mode.

The capacitor 56 of the rationalised module 52 is inserted into the corresponding chain-link converter 50 when the current flow control elements 54 in the rationalised module 52 are configured to allow the current 58 in the corresponding chain-link converter 50 to flow into and out of the capacitor 56. The capacitor 56 then charges or discharges its stored energy so as to provide a non-zero voltage, i.e. the rationalised module 52 is configured in a non-bypassed mode. The full-bridge arrangement of the rationalised module 52 permits configuration of the current flow control elements 54 in the rationalised module 52 to cause current 58 to flow into and out of the capacitor 56 in either direction, and so the rationalised module 52 can be configured to provide a negative or positive voltage in the non-bypassed mode.

Meanwhile the series connection of the primary passive current check element and primary active switching element of each set of current flow control elements 54 in the rationalised module 52 limits the flow of current 58 through the rationalised module 52 to a single direction. As such each rationalised module 52 is arranged such that current flowing in the first limb portion 38 can only flow from the AC terminal 42 to the first DC terminal 32, and current flowing in the second limb portion 40 can only flow from the second DC terminal 34 to the AC terminal 42.

In this manner the first and second sets of series-connected current flow control elements 54 are connected in parallel with the capacitor 56 in a full-bridge arrangement to define a 2-quadrant bipolar rationalised module that can provide zero, positive or negative voltage while conducting current in a single direction.

It is possible to build up a combined voltage across each chain-link converter 50, which is higher than the voltage available from each of its individual rationalised modules 52, via the insertion of the capacitors 56 of multiple rationalised modules 52, each providing its own voltage, into each chain-link converter 50. In this manner switching of the current flow control elements 54 in each rationalised module 52 causes each chain-link converter 50 to provide a stepped variable voltage source, which permits the generation of a voltage waveform across each chain-link converter 50 using a stepwise approximation.

It is envisaged that, in other embodiments of the invention, the capacitor 56 in each rationalised module 52 may be replaced by another type of energy storage device which is capable of storing and releasing energy, e.g. a battery or a fuel cell.

The first power electronic converter 30 further includes a first controller 60 to selectively switch each rationalised module 52 (i.e. control the switching of the current flow control elements 54 of each rationalised module 52) in each limb portion 38,40 to control the configuration of the AC voltage at the corresponding AC terminal 42.

For the purposes of this specification, the operation of the first power electronic converter 30 is described with reference to one of its converter limbs 36. It will be appreciated that the described operation of one of the converter limbs 36 of the first power electronic converter 30 applies mutatis mutandis to the operation of the other two converter limbs 36.

Figure 4A:
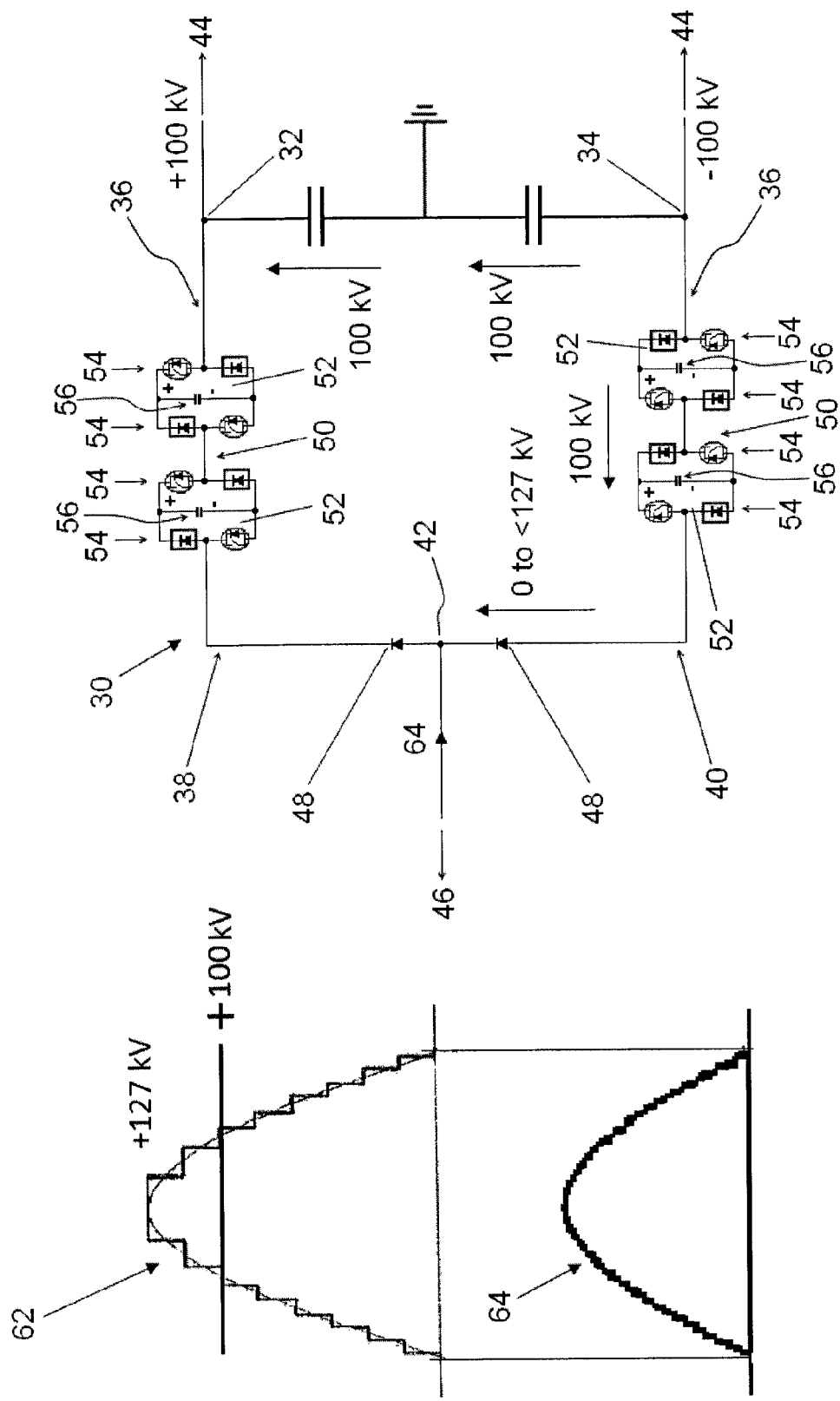
FIG. 4a shows, in schematic form, the operation of a converter limb of the power electronic converter of FIG. 2 in an AC to DC power transfer mode.

In use, the first power electronic converter 30 is operable to transfer power from the AC network 46 to the DC network 44 in an AC to DC power transfer mode. As shown in FIG. 4a, the first terminal of the DC network 44 carries a DC voltage of +100 kV and the second terminal of the DC network 44 carries a DC voltage of −100 kV, and the AC voltage of the AC network 46 varies between −127 kV and +127 kV.

The chain-link converter 50 in each limb portion 38,40 is rated to be capable of providing a maximum voltage of 227 kV thereacross.

This enables the chain-link converter 50 in the first limb portion 38 to provide the necessary variable voltage to synthesise the AC voltage at the AC terminal 42 in a voltage range extending between 0 kV to 127 kV, and enables the chain-link converter 50 in the second limb portion 40 to provide the necessary variable voltage to synthesise the AC voltage at the AC terminal 42 in a voltage range extending between 0 kV to −127 kV.

The secondary passive current check elements 48 in the first and second limb portions 38,40 dictate which limb portion is in conduction and thereby is in use to synthesise the AC voltage at the AC terminal 42. The configuration of the AC voltage at the AC terminal 42 is controlled by combining first and second AC voltage components 62 as follows.

To construct the first AC voltage component 62, the first limb portion 38 is in a conducting state by way of its secondary passive current check element 48 being forward-biased, and the first controller 60 controls the switching of the current flow control elements 54 of each rationalised module 52 in the first limb portion 38 to add and subtract voltage steps to, i.e. "push up" and "pull down", the voltage of +100 kV at the first DC terminal 32. The first AC voltage component 62 is constructed to be in the form of a positive, half-sinusoidal voltage waveform with a peak value of +127 kV while a positive AC current 64 flows into the AC terminal 42.

Meanwhile the second limb portion 40 is in a non-conducting state by way of its secondary passive current check element 48 being reverse-biased, and thus experiences a differential voltage thereacross, the differential voltage being the difference between the voltages at the AC terminal 42 and second DC terminal 34. Thus, the differential voltage experienced by the second limb portion 40 in the non-conducting state varies between 100 kV and 227 kV, and is shared between the secondary passive current check element 48, which is rated to block a voltage ranging from 0 to 127 kV, and the chain-link converter 50, which is configured to block a voltage of 100 kV.

To construct the second AC voltage component, the second limb portion 40 is in a conducting state by way of its secondary passive current check element 48 being forward-biased, and the first controller 60 controls the switching of the current flow control elements 54 of each rationalised module 52 in the second limb portion 40 to add and subtract voltage steps to, i.e. "push up" and "pull down", the voltage of −100 kV at the second DC terminal 32. The second AC voltage component is constructed to be in the form of a negative, half-sinusoidal voltage waveform with a peak value of −127 kV while a negative AC current flows into the AC terminal 42.

Meanwhile the first limb portion 38 is in a non-conducting state by way of its secondary passive current check element 48 being reverse-biased, and thus experiences a differential voltage thereacross, the differential voltage being the difference between the voltages at the AC terminal 42 and first DC terminal 32. Thus, the differential voltage experienced by the first limb portion 38 in the non-conducting state varies between 100 kV and 227 kV, and is shared between secondary passive current check element 48, which is rated to block a voltage ranging from 0 to 127 kV, and the chain-link converter 50, which is configured to block a voltage of 100 kV.

The combination of the first and second AC voltage components 62 over a duty cycle results in the synthesis, at the AC terminal 42, of a sinusoidal AC voltage with peak values of +127 kV and −127 kV. In this manner the first power electronic converter 30 controls the configuration of an AC voltage at the AC terminal 42 to transfer power from the AC network 46 to the DC network 44 in an AC to DC power transfer mode.

Figure 4B:
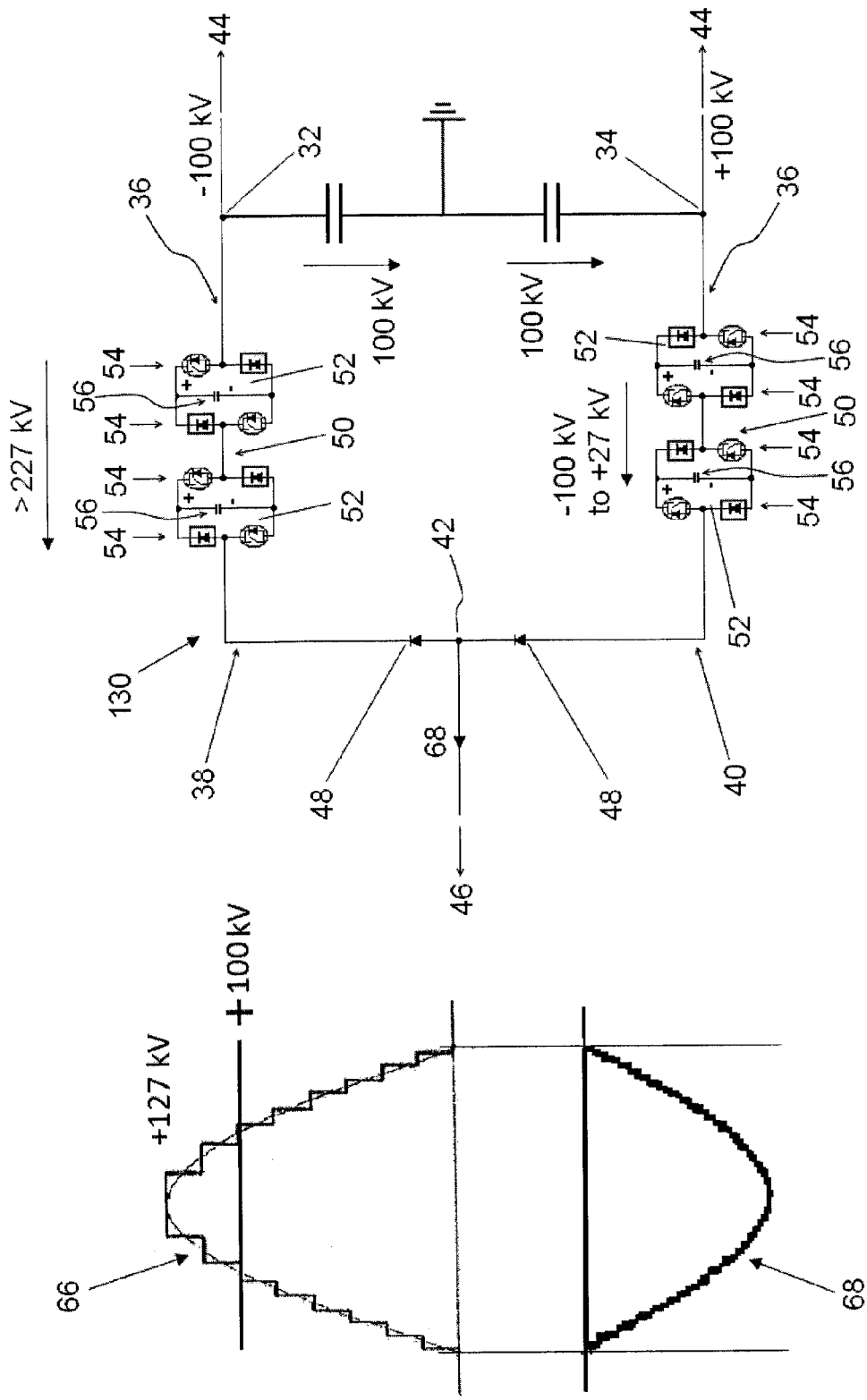
FIG. 4b shows, in schematic form, the operation of a converter limb of the power electronic converter of FIG. 2 in a DC to AC power transfer mode.

In use, the first power electronic converter 30 is operable to transfer power from the DC network 44 to the AC network 46 in a DC to AC power transfer mode. As shown in FIG. 4b, in the DC to AC power transfer mode, the polarity of the DC link voltage across the DC link is reversed. In particular, in the DC to AC power transfer mode, the first terminal of the DC network 44 carries a DC voltage of −100 kV and the second terminal of the DC network 44 carries a DC voltage of +100 kV. Meanwhile the AC voltage of the AC network 46 varies between −127 kV and +127 kV.

In the DC to AC power transfer mode, the configuration of the AC voltage at the AC terminal 42 is controlled by combining first and second AC voltage components 66 as follows.

To construct the first AC voltage component 66, the second limb portion 40 is in a conducting state, and the first controller 60 controls the switching of the current flow control elements 54 of each rationalised module 52 in the second limb portion 40 to add and subtract voltage steps to, i.e. "push up" and "pull down", the voltage of +100 kV at the second DC terminal 34. The first AC voltage component 66 is constructed to be in the form of a positive, half-sinusoidal voltage waveform with a peak value of +127 kV while a negative AC current 68 flows out of the AC terminal 42.

Meanwhile the first limb portion 38 is in a non-conducting state, and thus experiences a differential voltage thereacross, the differential voltage being the difference between the voltages at the AC terminal 42 and first DC terminal 32. Thus, the differential voltage experienced by the first limb portion 38 in the non-conducting state varies between 100 kV and 227 kV, and is supported entirely by the chain-link converter 50 which is configured to block a voltage varying between 100 kV and 227 kV. The secondary passive current check element 48 in the first limb portion 38 is forced into conduction by the reversal of the polarity of the DC link voltage across the DC link, and so is rendered incapable of blocking part of the differential voltage.

To construct the second AC voltage component, the first limb portion 38 is in a conducting state, and the first controller 60 controls the switching of the current flow control elements 54 of each rationalised module 52 in the first limb portion 38 to add and subtract voltage steps to, i.e. "push up" and "pull down", the voltage of −100 kV at the first DC terminal 32. The second AC voltage component is constructed to be in the form of a negative, half-sinusoidal voltage waveform with a peak value of −127 kV while a positive AC current flows out of the AC terminal 42.

Meanwhile the second limb portion 40 is in a non-conducting state, and thus experiences a differential voltage thereacross, the differential voltage being the difference between the voltages at the AC terminal 42 and second DC terminal 34. Thus, the differential voltage experienced by the second limb portion 40 in the non-conducting state varies between 100 kV and 227 kV, and is supported entirely by the chain-link converter 50 which is configured to block a voltage varying between 100 kV and 227 kV. The secondary passive current check element 48 in the second limb portion 40 is forced into conduction by the reversal of the polarity of the DC link voltage across the DC link, and so is rendered incapable of blocking part of the differential voltage.

The combination of the first and second AC voltage components 66 over a duty cycle results in the synthesis, at the AC terminal 42, of a sinusoidal AC voltage with peak values of +127 kV and −127 kV. In this manner the first power electronic converter 30 controls the configuration of an AC voltage at the AC terminal 42 to transfer power from the DC network 44 to the AC network 46 in the DC to AC power transfer mode.

The increase in rating of each chain-link converter 50 to enable it to provide a voltage of 227 kV thereacross enables each chain-link converter 50 to support the entire differential voltage experienced by the corresponding limb portion 38,40 in the non-conducting state in the DC to AC power transfer mode. In contrast, a voltage rating of 100 kV across each chain-link converter 50, whilst being sufficient to synthesise the corresponding AC voltage component 66 at the AC terminal 42, is insufficient to support the entire differential voltage experienced by the corresponding limb portion 38,40 in the non-conducting state in the DC to AC power transfer mode.

The arrangement of each chain-link converter 50 in the manner set out above therefore creates a power electronic converter 30 with a symmetrical power transfer functionality, in which the power electronic converter 30 provides full power transfer functionality in both the AC to DC and the DC to AC power transfer modes.

The construction, at the AC terminal 42, of the AC voltage with peak values which are 27% higher than the respective DC voltages at the first and second DC terminals 32,34 means that the product of the voltage provided by each chain-link converter 50 and the current flowing through each chain-link converter 50 gives a net zero energy exchange in each chain-link converter 50 over half of a duty cycle. In addition, the structure of the rationalised module 52 permits the unidirectional current flowing through the rationalised module 52 to flow in either forward or reverse directions through the capacitor 56. This in turn allows selective real-time charging and discharging, and thereby control of the voltage level, of the capacitor 56 in each rationalised module 52 whilst the power electronic converter is operated to transfer power from the AC network 46 to the DC network 44.

The series-connection of the secondary passive current check element 48 and chain-link converter 50 in each limb portion 38,40 means that each limb portion 38,40 does not require an active switching element connected in series with the chain-link converter 50 to dictate which limb portion is in conduction. This results in a more cost-efficient and reliable power electronic converter, since passive current check elements are lighter, smaller, and simpler than active switching elements.

The arrangement of the first power electronic converter 30 results in a small, lightweight, inexpensive, efficient and reliable means of connecting the AC and DC networks 46,44 and transferring power from the AC network 46 to the DC network 44.

Figure 5:
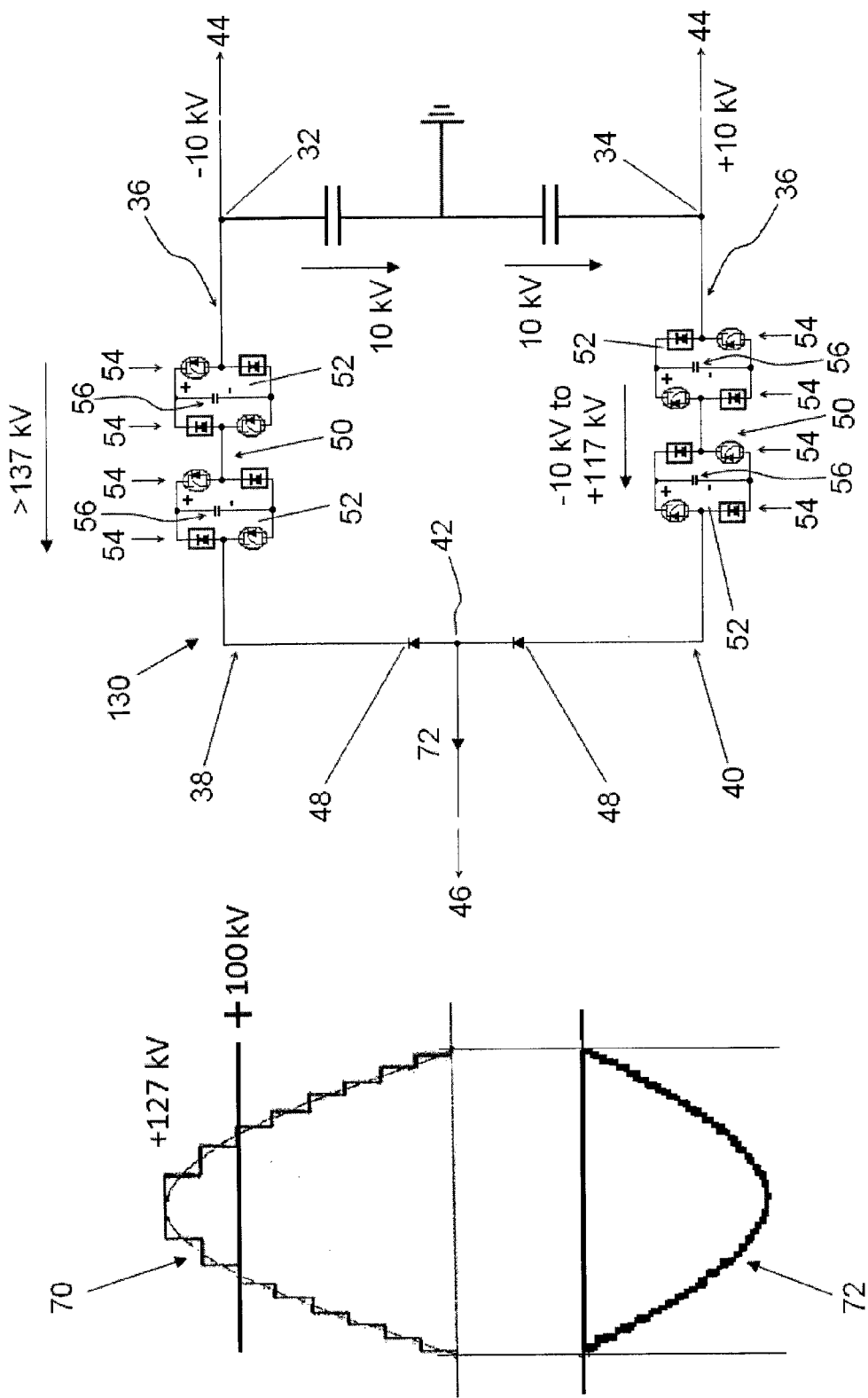
FIG. 5 shows, in schematic form, a power electronic converter according to a second embodiment of the invention.

A second power electronic converter 130 according to a second embodiment of the invention is shown in FIG. 5. The structure and operation of the second power electronic converter 130 of FIG. 5 is similar to the structure and operation of the first power electronic converter 30 of FIG. 2, and like features share the same reference numerals.

The second power electronic converter 130 differs from the first power electronic converter 30 in that, in the second power electronic converter 130, the chain-link converter 50 in each limb portion 38,40 is rated to be capable of providing a maximum voltage of 137 kV thereacross, instead of a maximum voltage of 227 kV thereacross.

In use, the second power electronic converter 130 is operable to transfer power from the AC network 46 to the DC network 44 in an AC to DC power transfer mode. The operation of the second power electronic converter 130 in the AC to DC power transfer mode is the same as the earlier-described operation of the first power electronic converter 30 in the AC to DC power transfer mode.

In use, the second power electronic converter 130 is operable to transfer power from the DC network 44 to the AC network 46 in a DC to AC power transfer mode. In the DC to AC power transfer mode, the polarity of the DC link voltage across the DC link is reversed. In particular, in the DC to AC power transfer mode, the first terminal of the DC network 44 carries a DC voltage of −10 kV and the second terminal of the DC network 44 carries a DC voltage of +10 kV. Meanwhile the AC voltage of the AC network 46 varies between −127 kV and +127 kV.

In the DC to AC power transfer mode, the configuration of the AC voltage at the AC terminal 42 is controlled by combining first and second AC voltage components 70 as follows.

To construct the first AC voltage component 70, the second limb portion 40 is in a conducting state, and the first controller 60 controls the switching of the current flow control elements 54 of each rationalised module 52 in the second limb portion 40 to add and subtract voltage steps to, i.e. "push up" and "pull down", the voltage of +10 kV at the second DC terminal 34. The first AC voltage component 70 is constructed to be in the form of a positive, half-sinusoidal voltage waveform with a peak value of +127 kV while a negative AC current 72 flows out of the AC terminal 42.

Meanwhile the first limb portion 38 is in a non-conducting state, and thus experiences a differential voltage thereacross, the differential voltage being the difference between the voltages at the AC terminal 42 and first DC terminal 32. Thus, the differential voltage experienced by the first limb portion 38 in the non-conducting state varies between 10 kV and 137 kV, and is supported entirely by the chain-link converter 50 which is configured to block a voltage varying between 10 kV and 137 kV. The secondary passive current check element 48 in the first limb portion 38 is forced into conduction by the reversal of the polarity of the DC link voltage across the DC link, and so is rendered incapable of blocking part of the differential voltage.

To construct the second AC voltage component, the first limb portion 38 is in a conducting state, and the first controller 60 controls the switching of the current flow control elements 54 of each rationalised module 52 in the first limb portion 38 to add and subtract voltage steps to, i.e. "push up" and "pull down", the voltage of −10 kV at the first DC terminal 32. The second AC voltage component is constructed to be in the form of a negative, half-sinusoidal voltage waveform with a peak value of −127 kV while a positive AC current flows out of the AC terminal 42.

Meanwhile the second limb portion 40 is in a non-conducting state, and thus experiences a differential voltage thereacross, the differential voltage being the difference between the voltages at the AC terminal 42 and second DC terminal 34. Thus, the differential voltage experienced by the second limb portion 40 in the non-conducting state varies between 10 kV and 137 kV, and is supported entirely by the chain-link converter 50 which is configured to block a voltage varying between 10 kV and 137 kV. The secondary passive current check element 48 in the second limb portion 40 is forced into conduction by the reversal of the polarity of the DC link voltage across the DC link, and so is rendered incapable of blocking part of the differential voltage.

The combination of the first and second AC voltage components 70 over a duty cycle results in the synthesis, at the AC terminal 42, of a sinusoidal AC voltage with peak values of +127 kV and −127 kV. In this manner the second power electronic converter 130 controls the configuration of an AC voltage at the AC terminal 42 to transfer power from the DC network 44 to the AC network 46 in the DC to AC power transfer mode.

The increase in rating of each chain-link converter 50 to enable it to provide a maximum voltage of 137 kV thereacross, instead of a maximum voltage of 227 kV thereacross, enables each chain-link converter 50 to support the entire differential voltage experienced by the corresponding limb portion in the non-conducting state in the DC to AC power transfer mode whilst limiting the power transferable in the DC to AC power transfer mode to be 10% of the power transferable in the AC to DC power transfer mode.

It is envisaged that, in other embodiments of the invention, the chain-link converter 50 in each limb portion 38,40 may be rated to be capable of providing a different voltage thereacross to limit the power transferable in the DC to AC power transfer mode to be a different percentage of the power transferable in the AC to DC power transfer mode.

The configuration of each chain-link converter 50 in the manner set out above therefore creates a power electronic converter 130 with an asymmetrical power transfer functionality, in which the power electronic converter 130 provides full power transfer functionality in the AC to DC power transfer mode and is able to provide power transfer in the DC to AC power transfer mode at a reduced level.

A power electronic converter 130 with an asymmetrical power transfer functionality is perfectly acceptable in certain power transfer applications with asymmetrical power transfer requirements. For example, the second power electronic converter 130 may be used in power transfer applications where there is a heavy bias towards the export of power to the DC network 44 and a minimal need to import power, such as arises in renewable wind and tidal power generation where the required power transfer is predominantly from the source to a distribution grid. The minimal need to import power may relate to infrequent transmission of power at a reduced level in the opposite direction for the purpose of starting up or operating hardware of wind and tidal farms before the hardware transitions to a power generation mode of operation once availability of the prime mover (wind or waves) is sufficient to generate the required amount of power.

The configuration of each chain-link converter 50 in the manner set out above to create a second power electronic converter 130 with an asymmetrical power transfer functionality results in a more optimal power electronic converter for power transfer applications with asymmetrical power transfer requirements, in terms of losses, efficiency, size, weight and cost.

Furthermore, the series-connection of the secondary passive current check element 48 and chain-link converter 50 in each limb portion 38,40 obviates the need for each chain-link converter 50 to be capable of blocking the entire differential voltage in the AC to DC power transfer mode, thus permitting a reduction in voltage rating of each chain-link converter 50. This therefore reduces considerably the required number of rationalised modules 52 in each chain-link converter 50 required to carry out transfer of power between the AC and DC networks 46,44.

It is envisaged that, in other embodiments of the invention, the secondary passive current check element 48 in each limb portion 38,40 may be replaced by one or more secondary active switching elements that is connected in series with each rationalised module.

In use, the or each secondary active switching element is switchable to dictate which limb portion is in conduction and thereby is in use to synthesise the AC voltage at the AC terminal. The or each secondary active switching element in each limb portion may be configured to be capable of blocking both forward and reverse voltages. This means that the chain-link converter in each limb portion would be required to block only part of the differential voltage for both the AC to DC and DC to AC power transfer modes, thus obviating the need to increase the voltage rating of the chain-link converter in each limb portion to be capable of supporting the entire differential voltage experienced by that limb portion in the non-conducting state in both the AC to DC and DC to AC power transfer modes.

It is also envisaged that, in other embodiments of the invention, the power electronic converter may include a different number of converter limbs, wherein the AC terminal of each converter limb is connectable to a respective phase of a multi-phase AC network.

It is further envisaged that, in other embodiments of the invention, the power electronic converter may include a single converter limb, wherein the AC terminal is connectable to a single-phase AC network.

It will be appreciated that the voltage values used in the embodiments shown are merely chosen to illustrate the operation of the respective embodiment of the power electronic converter, and thus may vary in practice depending on the power requirements of the associated power application.

The invention claimed is:

1. A power electronic converter, for connecting AC and DC networks and transferring power therebetween, comprising:
   first and second DC terminals defining a DC link for connection to a DC network; wherein, in use, the DC link has a reversible DC link voltage applied thereacross;
   at least one converter limb extending between the first and second DC terminals and having first and second limb portions separated by an AC terminal for connection to an AC network, each limb portion including a plurality of rationalised modules, each rationalised module having first and second sets of series-connected current flow control elements connected in parallel with at least one energy storage device, each set of current flow control elements connected in parallel with at least one energy storage device, each set of current flow control elements including a primary active switching element to selectively direct current through the energy storage device and a primary passive current check element to limit current flow through the rationalised module to a single direction, the current flow control elements and the or each energy storage device combining to selectively provide a voltage source to synthesise an AC voltage at the AC terminal; and a first controller to selectively switch each rationalised module in each limb portion to control the configuration of the AC voltage at the corresponding AC terminal so as to transfer power from the AC network to the DC network in an AC to DC power transfer mode and to transfer power from the DC network to the AC network in a DC to AC power transfer mode, wherein each limb portion includes one or more secondary passive current check elements to limit current flow through the corresponding limb portion to a single direction between the corresponding AC and DC terminals, the or each secondary passive current check element being connected in series with the respective plurality of rationalised modules, characterised in that the first controller is configured to switch each rationalised module in each limb portion so that the or each secondary passive current check element supports part of a differential voltage appearing across the corresponding limb portion and each plurality of rationalised modules supports the other part of the differential voltage appearing across the corresponding limb portion in one of the AC to DC and DC to AC power transfer modes, and the first controller is configured to switch each rationalised module in each limb portion so that each plurality of rationalised modules supports a differential voltage appearing across the corresponding limb portion when the or each corresponding secondary passive current check element is forced into conduction by a reversal of polarity of the DC link voltage across the DC link in the other of the AC to DC and DC to AC power transfer modes.

2. The power electronic converter according to claim 1 wherein the first and second sets of series-connected current flow control elements are connected in parallel with the respective energy storage device in a full-bridge arrangement to form a 2-quadrant bipolar rationalised module that can provide zero, positive or negative voltage while conducting current in a single direction.

3. The power electronic converter according to claim 1 wherein each rationalised module in each limb portion is configured so that the plurality of rationalised modules in each limb portion is rated to be capable of providing a maximum voltage thereacross to limit the power transferable in the DC to AC power transfer mode to be less than the power transferable in the AC to DC power transfer mode.

4. The power electronic converter according to claim 1 wherein each rationalised module in each limb portion is configured so that the plurality of rationalised modules in each limb portion is rated to be capable of providing a maximum voltage thereacross to limit the power transferable in the DC to AC power transfer mode to be in the range of 10% to 15% of the power transferable in the AC to DC power transfer mode.

5. A method of operating a power electronic converter for connecting AC and DC networks and transferring power therebetween, the power electronic converter comprising first and second DC terminals defining a DC link for connection to a DC network, wherein, in use, the DC link has a reversible DC link voltage applied thereacross, the power electronics converter further comprising at least one converter limb extending between the first and second DC terminals and having first and second limb portions separated by an AC terminal for connection to an AC network, each limb portion including a plurality of rationalised modules, each rationalised module having first and second sets of series-connected current flow control elements connected in parallel with at least one energy storage device, each set of current flow control elements connected in parallel with at least one energy storage device, each set of current flow control elements including a primary active switching element to selectively direct current through the energy storage device and a primary passive current check element to limit current flow through the rationalised module to a single direction, the current flow control elements and the or each energy storage device combining to selectively provide a voltage source to synthesise an AC voltage at the AC terminal, wherein each limb portion includes one or more secondary passive current check elements to limit current flow through the corresponding limb portion to a single direction between the corresponding AC and DC terminals, the or each secondary passive current check element being connected in series with the respective plurality of rationalised modules, the method comprising:

selectively switching each rationalised module in each limb portion to control the configuration of the AC voltage at the corresponding AC terminal so as to transfer power from the AC network to the DC network in an AC to DC power transfer mode and to transfer power from the DC network to the AC network in a DC to AC power transfer mode;

switching each rationalised module in each limb portion so that the or each secondary passive current check element supports part of a differential voltage appearing across the corresponding limb portion and each plurality of rationalised modules supports the other part of the differential voltage appearing across the corresponding limb portion in one of the AC to DC and DC to AC power transfer modes; and switching each rationalised module in each limb portion so that each plurality of rationalised modules supports a differential voltage appearing across the corresponding limb portion when the or each corresponding secondary passive current check element is forced into conduction by a reversal of polarity of the DC link voltage across the DC link in the other of the AC to DC and DC to AC power transfer modes.

6. The method according to claim 5 wherein the first and second sets of series-connected current flow control elements are connected in parallel with the respective energy storage device in a full-bridge arrangement to form a 2-quadrant bipolar rationalised module that can provide zero, positive or negative voltage while conducting current in a single direction.

7. The method according to claim 5 wherein each rationalised module in each limb portion is configured so that the plurality of rationalised modules in each limb portion is rated to be capable of providing a maximum voltage thereacross to limit the power transferable in the DC to AC power transfer mode to be less than the power transferable in the AC to DC power transfer mode.

8. The method according to claim 5 wherein each rationalised module in each limb portion is configured so that the plurality of rationalised modules in each limb portion is rated to be capable of providing a maximum voltage thereacross to limit the power transferable in the DC to AC power transfer mode to be in the range of 10% to 15% of the power transferable in the AC to DC power transfer mode.

* * * * *